Nov. 11, 1947.  J. M. O'MALLEY  2,430,683
WABBLER COUPLING
Filed Oct. 30, 1945  2 Sheets-Sheet 1

Inventor
JOSEPH M. O'MALLEY

By Albert G. Blodgett
Attorney

Nov. 11, 1947.  J. M. O'MALLEY  2,430,683
WABBLER COUPLING
Filed Oct. 30, 1945  2 Sheets-Sheet 2

Inventor
JOSEPH M. O'MALLEY
By Albert G. Blodgett
Attorney

Patented Nov. 11, 1947

2,430,683

UNITED STATES PATENT OFFICE 2,430,683

WABBLER COUPLING

Joseph M. O'Malley, Worcester, Mass., assignor to Morgan Construction Company, Worcester, Mass., a corporation of Massachusetts Application October 30, 1945, Serial No. 625,612

6 Claims. (Cl. 64—8)

This invention relates to wabbler couplings, and more particularly to the construction and arrangement of coupling spindles of the type used for connecting the roll necks in a rolling mill to the pinion shafts.

It has heretofore been a common practice to provide a spindle having fluted ends which are connected to the roll necks and pinion shafts by means of internally fluted sleeves. Since the flutes cannot be machined except at great trouble and expense, they have ordinarily been left rough, ample clearance being provided to allow ready assembly of the parts. Because of this clearance, the sleeve has not been properly centered on the other parts, and in operation there has frequently been considerable vibration and noise, with severe wear on the contacting surfaces.

It is accordingly one object of the invention to provide a wabbler coupling of simple and inexpensive construction which will operate throughout a long life of useful service without appreciable vibration and noise.

It is a further object of the invention to provide a wabbler coupling having readily machinable surfaces so located as to center the various parts accurately and thereby avoid excessive vibration and noise during operation.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a longitudinal section through a wabbler coupling, the section being taken on the line 1—1 of Fig. 5;

Figure 1:
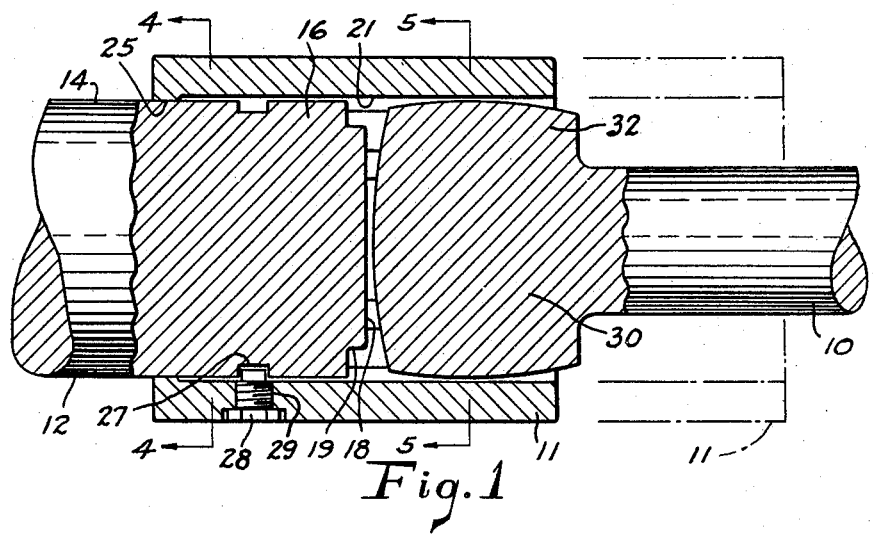

The embodiment illustrated comprises a spindle 10, one end of the spindle being connected by means of a sleeve 11 to a rotatable member or element in the form of a roll neck 12. It will be understood that the other end of the spindle may be similarly connected to a second rotatable element, such as a pinion shaft (not shown). Since rolling mill rolls must be adjusted in position, whereas the pinion shafts rotate about fixed axes, it is necessary that the spindle be capable of operation in spite of misalignment of these parts.

The roll neck 12 is formed with a cylindrical outer surface 14 which is interrupted by four longitudinally extending deep grooves or flutes 15 separated by four longitudinally extending heavy ribs 16. On the end of the roll neck there is provided a portion 18 which projects axially for a short distance beyond the ends of the ribs 16. This portion 18 is formed with a cylindrical outer surface 19 coaxial with the surface 14 but somewhat smaller in diameter. The diameter of the surface 19 is sufficient to bring it slightly above the bottoms of the grooves 15.

The internal surface of the sleeve 11 is formed with four longitudinal extending deep grooves or flutes 21 separated by four longitudinally extending heavy ribs 22, the shapes and dimensions of the various parts being such that the ribs 22 will intermesh loosely with the ribs 16 on the roll neck. The inner surfaces 23 of the ribs 22 are accurately finished by a suitable machining operation to conform with a cylinder having a diameter substantially equal to that of the cylindrical surface 19. The ribs 22 terminate a short distance from the end of the sleeve 11 adjacent the roll neck, as best shown in Fig. 2, to leave a projecting sleeve portion having an inner cylindrical surface 25 which is accurately finished with a diameter substantially equal to that of the cylindrical surface 14.

Figure 2:
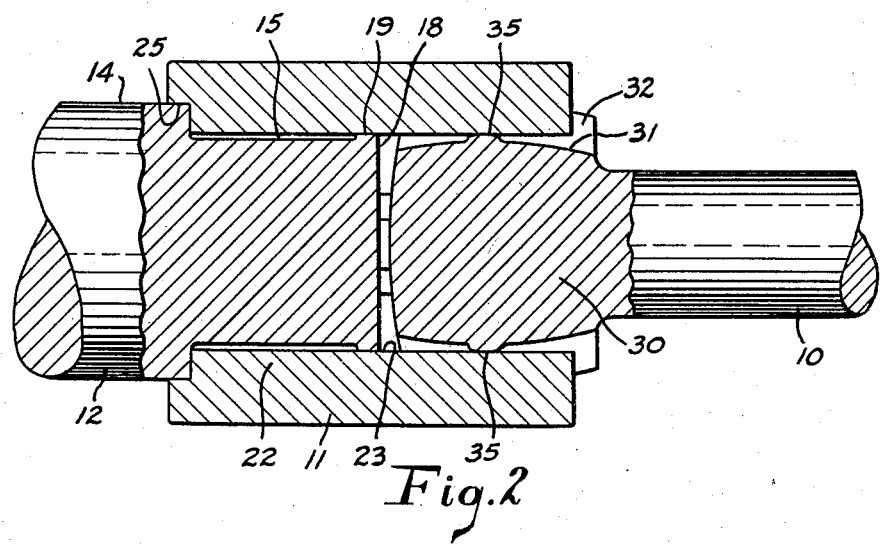
Fig. 2 is a section taken on the line 2—2 of Fig. 5.

It will now be apparent from Fig. 2 that at assembly the surface 25 of the sleeve will engage the surface 14 of the roll neck, and the surfaces 23 of the ribs 22 will engage the surface 19 of the portion 18. Thus the sleeve will be accurately centered on the roll neck by engagement therewith in two regions which are widely spaced apart in the axial direction. With this construction the sleeve will be firmly supported against any tendency to rock in axial planes.

Any suitable means may be provided to retain the sleeve 11 in position on the roll neck 12. In the particular embodiment illustrated the roll neck is provided with a shallow circumferential groove 27 which extends across each of the ribs 16, and a screw 28 is mounted in a threaded radial hole 29 in the sleeve, the inner end of the screw entering the groove in one of the ribs.

Figure 3:
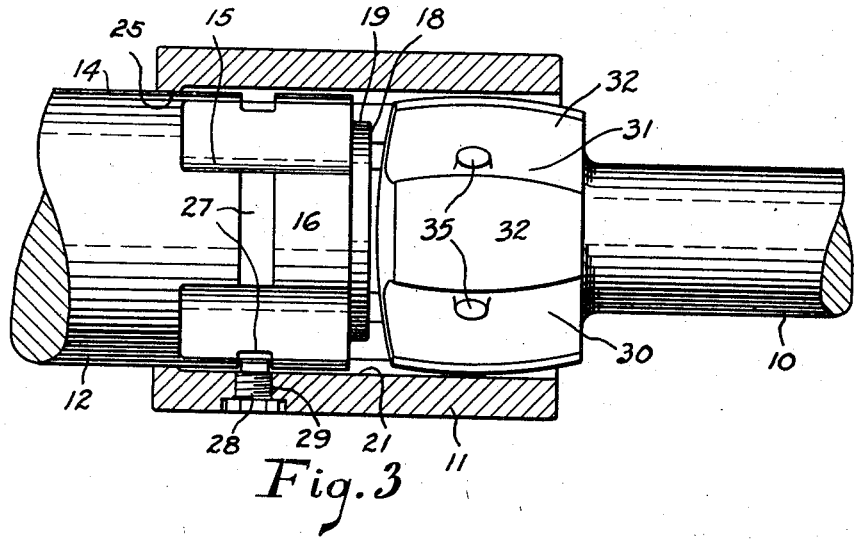
Fig. 3 is a view similar to Fig. 1, with the roll neck and spindle shown in elevation instead of in section.
Figure 4:
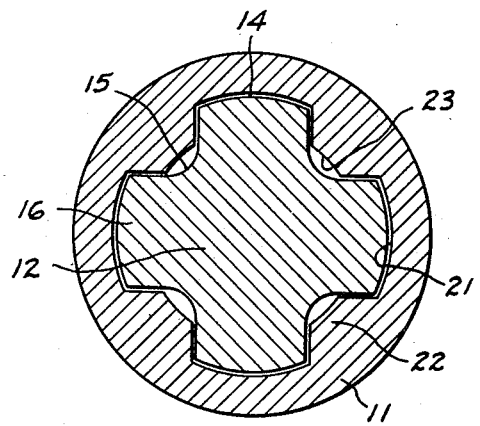
Fig. 4 is a section taken on the line 4—4 of Fig. 1.

The sleeve 11 and its ribs 22 are elongated sufficiently to extend for an appreciable distance beyond the end of the roll neck and thereby provide a socket for the reception of an enlarged head 30 on the adjacent end of the spindle 10. This head is formed with four longitudinally extending deep grooves or flutes 31 separated by four longitudinally extending heavy ribs 32. These parts are of such shapes and dimensions that the ribs 32 will intermesh loosely with the ribs 22 of the sleeve. In order that the coupling may accommodate appreciable angular misalignment, the outer surfaces of the ribs 32 and the bottoms of the grooves 31 are made convex in axial planes, as shown in Figs. 1 and 2, and the sides of the ribs 32 are likewise made convex, as shown in Fig. 3.

Figure 5:
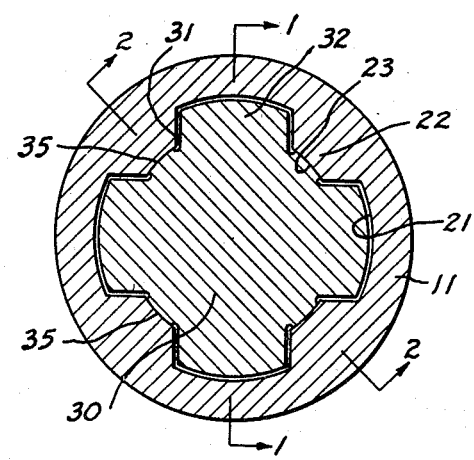
Fig. 5 is a section taken on the line 5—5 of Fig. 1.

The coupling includes means to center the spindle head 30 accurately within the sleeve 11. For this purpose a small boss 35 is provided within each of the spindle head grooves 31 to engage the inner surface 23 of the adjacent rib 22. The faces of these bosses are accurately finished to provide surfaces which are equidistant from the axis of the spindle, there being only a very slight clearance between these faces and the surfaces 23 of the ribs. Preferably the boss faces are outwardly convex not only in the transverse plane as indicated in Fig. 5 but also in axial planes as indicated in Fig. 2, so that they will conform at least approximately to the surface of a sphere having its center on the spindle axis.

It will be apparent that the invention provides a wabbler coupling which is very inexpensive to manufacture and yet capable of transmitting heavy loads efficiently, quietly, and without vibration even under adverse operating conditions. The sleeve 11 is accurately and firmly supported on the roll neck 12 by reason of the engagement of the surface 25 with the surface 14, and the engagement of the rib surfaces 23 with the surface 19. The bosses 35 center the spindle head 30 accurately within the sleeve by engaging the rib surfaces 23, while permitting free angular movement of the spindle as required by misalignment of the driving and driven elements. These bosses 35 are the only parts of the spindle heads which need to be accurately finished, rough cast surfaces being satisfactory for the other surfaces which have ample clearances with respect to the sleeve. Neither the grooves 21 in the sleeve nor the grooves 15 in the roll neck require accurate finishing, and they likewise can be left as cast. The machining of the roll neck is a simple turning operation, and the machining of the sleeve is a simple boring operation. To disconnect the coupling it is merely necessary to remove the screw 28 and withdraw the sleeve 11 axially over the spindle to the position indicated by the broken lines in Fig. 1.

Having thus described my invention, what I claim as new and desire to secure by Letters Patent is:

1. A wabbler coupling comprising a rotatable member, a sleeve mounted on the member and projecting beyond the end thereof to provide a socket, the projecting portion of the sleeve having on its inner surface a plurality of longitudinally extending heavy ribs separated by longitudinally extending deep grooves, the inner surfaces of the ribs being equidistant from the axis of the sleeve, a rotatable spindle having an end portion located within the socket, the said end portion having on its outer surface a plurality of longitudinally extending heavy ribs separated by longitudinally extending deep grooves, the ribs on the spindle intermeshing loosely with the ribs on the sleeve, and bosses at the bottoms of the grooves on the spindle to provide outer faces which are spaced from the spindle axis substantially the same distance as the inner surfaces of the sleeve ribs are spaced from the sleeve axis, the bosses engaging the sleeve ribs to center the spindle within the socket.

2. A wabbler coupling comprising a rotatable member, a sleeve mounted on the member and projecting beyond the end thereof to provide a socket, the projecting portion of the sleeve having on its inner surface a plurality of longitudinally extending heavy ribs separated by longitudinally extending deep grooves, the inner surfaces of the ribs being equidistant from the axis of the sleeve, a rotatable spindle having an end portion located within the socket, the said end portion having on its outer surface a plurality of longitudinally extending heavy ribs separated by longitudinally extending deep grooves, the ribs on the spindle intermeshing loosely with the ribs on the sleeve, the outer surfaces of the spindle ribs and the bottoms of the spindle grooves being convex in axial planes and the sides of the spindle ribs being convex, and bosses at the bottoms of the grooves on the spindle to provide outer faces which are spaced from the spindle axis substantially the same distance as the inner surfaces of the sleeve ribs are spaced from the sleeve axis, the bosses engaging the sleeve ribs to center the spindle within the socket.

3. A wabbler coupling comprising a rotatable member, a sleeve mounted on the member and projecting beyond the end thereof to provide a socket, the projecting portion of the sleeve having as its inner surface a plurality of longitudinally extending heavy ribs separated by longitudinally extending deep grooves, the inner surfaces of the ribs being accurately finished to conform with a cylinder coaxial with the sleeve, a rotatable spindle having an end portion located within the socket, the said end portion having on its outer surface a plurality of longitudinally extending heavy ribs separated by longitudinally extending deep grooves, the ribs on the spindle intermeshing loosely with the ribs on the sleeve, and bosses at the bottom of the grooves on the spindle to provide outer surfaces which are spaced from the spindle axis substantially the same distance as the cylindrical inner surfaces of the sleeve ribs are spaced from the sleeve axis, the bosses engaging the sleeve ribs to center the spindle within the socket.

4. A wabbler coupling comprising a rotatable member, a sleeve mounted on the member and projecting beyond the end thereof to provide a socket, the projecting portion of the sleeve having on its inner surface a plurality of longitudinally extending heavy ribs separated by longitudinally extending deep grooves, the inner surfaces of the ribs being accurately finished to conform with a cylinder coaxial with the sleeve, a rotatable spindle having an end portion located within the socket, the said end portion having on its outer surface a plurality of longitudinally extending heavy ribs separated by longitudinally extending deep grooves, the ribs on the spindle intermeshing loosely with the ribs on the sleeve, and bosses at the bottoms of the grooves on the spindle to provide outer surfaces which are convex and conform at least approximately to the surface of a sphere having its center on the spindle axis and its diameter equal to that of the said cylinder, the bosses engaging the sleeve ribs to center the spindle within the socket.

5. A wabbler coupling comprising a rotatable member having a cylindrical outer surface interrupted by longitudinally extending deep grooves separated by heavy ribs, a sleeve mounted on the member and having on its inner surface a plurality of longitudinally extending heavy ribs which intermesh loosely with the ribs on the member, the inner surfaces of the sleeve ribs being accurately finished to conform with a cylinder coaxial with the sleeve, the sleeve and its ribs projecting beyond the end of the member to provide a socket, a rotatable spindle having an end portion located within the socket, the said end portion having on its outer surface a plurality of longitudinally extending heavy ribs separated by longitudinally extending deep grooves and intermeshing loosely with the ribs on the sleeve, bosses at the bottoms of the spindle grooves providing accurately finished outer surfaces to engage the inner surfaces of the sleeve ribs and center the spindle within the socket, the sleeve ribs terminating short of the end of the sleeve adjacent the rotatable member and the said end of the sleeve providing an accurately finished cylindrical inner surface for engagement with the outer surface of the rotatable member, the rotatable member having accurately finished means on its end to engage the inner surfaces of the sleeve ribs.

6. A wabbler coupling comprising a rotatable member having a cylindrical outer surface interrupted by longitudinally extending deep grooves separated by heavy ribs, a portion projecting a short distance axially from the end of the member and beyond the ribs, the said portion having a cylindrical outer surface smaller in diameter than the said outer surface of the member and located slightly above the bottoms of the said grooves, a sleeve mounted on the member and having on its inner surface a plurality of heavy ribs which intermesh loosely with the ribs on the member, the inner surfaces of the sleeve ribs conforming with a cylinder coaxial with the sleeve and of a diameter substantially equal to that of the said projecting portion to engage the same, the sleeve and its ribs projecting beyond the end of the member to provide a socket, the sleeve ribs terminating short of the end of the sleeve adjacent the rotatable member and the said end of the sleeve providing a cylindrical inner surface which engages the outer surface of the rotatable member, a rotatable spindle having an end portion located within the socket and having on its outer surface a plurality of longitudinally extending heavy ribs which intermesh loosely with the sleeve ribs, and bosses located between the ribs on the spindle to provide outer surfaces for engagement with the inner surfaces of the sleeve ribs to center the spindle within the socket.

JOSEPH M. O'MALLEY.

REFERENCES CITED

The following references are of record in the file of this patent:

UNITED STATES PATENTS

| Number | Name | Date |
| --- | --- | --- |
| 1,578,664 | Inslee | Mar. 30, 1926 |
| 2,365,772 | O'Malley | Dec. 26, 1944 |
| 2,136,947 | Morgan | Nov. 15, 1938 |